United States Patent
Sawada et al.

[11] 3,896,322
[45] July 22, 1975

[54] SPARK PLUG OPERABLE WITH A FLOATING ARC

[75] Inventors: Daisaku Sawada; Yuji Takeda, both of Susono, Japan

[73] Assignee: Toyota Jidosha Kogyo Kabushiki Kaisha, Toyota, Japan

[22] Filed: Jan. 28, 1974

[21] Appl. No.: 436,840

[30] Foreign Application Priority Data
Sept. 25, 1973 Japan.............................. 48-111637

[52] U.S. Cl............................. 313/142; 313/143
[51] Int. Cl. ............................................ H01t 13/20
[58] Field of Search ........... 313/141, 142, 143, 118; 123/169 EL, 169 EA

[56] References Cited
UNITED STATES PATENTS

| | | | |
|---|---|---|---|
| 1,267,203 | 5/1918 | Frank................. | 313/142 X |
| 1,354,945 | 10/1920 | Blomster et al................. | 313/143 X |
| 1,377,854 | 5/1921 | Roberts........................... | 313/142 X |
| 1,495,716 | 5/1924 | Royer .............................. | 313/142 X |
| 1,669,992 | 5/1928 | Mosler............................ | 313/143 X |
| 2,597,718 | 5/1952 | Field................................ | 313/142 X |

*Primary Examiner*—Alfred L. Brody
*Attorney, Agent, or Firm*—Stewart and Kolasch, Ltd.

[57] ABSTRACT

A spark plug comprising flow regulating means to regulate the flowing direction of a fuel-air mixture so that it traverses a spark gap prepared to extend substantially along said flowing direction said gap being provided with a narrowed portion between two oppositely arranged electrodes at an upstream region of the flow of the fuel-air mixture whereby an arc is always initiated at said narrowed portion of the gap region and carried down said gap by the flow of the mixture, while maintaining a stable condition for a period sufficient to complete the ignition.

12 Claims, 3 Drawing Figures

3,896,322

SPARK PLUG OPERABLE WITH A FLOATING ARC

BACKGROUND OF THE INVENTION

1. Field of the Invention

This invention relates to a spark plug for use with internal combustion engines of the spark ignition type.

2. Description of the Prior Art

With particular view to the recent necessity to purify the exhaust gases of the internal combustion engine, it is endeavoured to use a possibly leaner fuel-air mixture while ensuring rapid and perfect combustion of the fuel within the combustion chamber of the engine to maintain a stable operation of the engine. As a means for accomplishing such a requirement, it has been proposed to form a small chamber called an auxiliary chamber within a combustion chamber by separating a small region including the ignition arc generating region of a spark plug from the remaining region of the combustion chamber and to supply a fuel-air mixture, and more advantageously, a richer fuel air mixture to said small chamber. Thus, said fuel-air mixture is first combusted in said small chamber to generate therein a combustion flame having a high temperature and a high pressure, and then said combustion flame is vigorously blown out into the combustion chamber to accelerate the combustion of all of the fuel contained in the combustion chamber and to accomplish a good combustion thereof. In such a combustion chamber having an auxiliary chamber, there is normally generated a relatively strong flow of the fuel air mixture traversing the spark gap of the spark plug during the period before the combustion has been established and, therefore, a problem has been created wherein a good ignition by a stable arc is difficult to obtain because if an arc has once been generated between opposite electrodes which have been applied with a high voltage, said arc is blown by the flow of the fuel-air mixture and is deformed to become an outwardly expanded arc. As a result of being expanded too much, the arc becomes unable to maintain itself and thus vanishes. After a while, through the accumulation of energy, the arc is again generated and again blown out in the same manner, thereby repeating said generation and extinction of the arc at definite time intervals.

SUMMARY OF THE INVENTION

Therefore, it is the object of this invention to solve the aforementioned problem and to provide an improved spark plug which is able to maintain a stable arc even in a relatively strong flow of a fuel-air mixture, thereby providing a good ignition of the fuel-air mixture even under such a turbulent condition.

According to this invention, the abovementioned object is accomplished by a spark plug comprising a flow regulating means to regulate the flowing direction of a fuel air mixture traversing a spark gap, and electrodes oppositely arranged to define therebetween said spark gap which extends substantially along the flow of the fuel-air mixture regulated by said flow regulating means, said spark gap being the narrowest at a region between the electrodes located upstream of said flow.

In such a spark plug according to this invention, when a high voltage is applied between the oppositely arranged electrodes, an arc to be generated between the electrodes is initiated at a region where the gap between the two electrodes is the narrowest which, in this case, is the region located upstream of the flow of the fuel air mixture traversing the arc disposed between the two electrodes and flowing in the direction regulated by said flow regulating means. Thereafter, the arc is urged by the flow of the fuel air mixture and will be shifted through the spark gap extending substantially along the flow of the fuel air mixture, by floating in the fuel-air flow. Nevertheless, the arc is constantly maintained in a stable state, whereby the expansion of the arc by being blown by the flow of the fuel-air mixture is avoided and also the extinguishing of the arc because it cannot maintain itself due to too much expansion, as in the case of conventional electrodes having oppositely disposed pointed ends defining a spark gap therebetween, is also avoided.

According to a particular feature of this invention, said flow regulating means may be an opening to introduce the fuel air mixture into a pre-combustion chamber in which said spark gap is arranged. In this case, said opening may preferably be formed at a wall portion of a casing defining said pre-combusition chamber to be formed substantially parallel to the longitudinal axis of the spark plug. Said oppositely arranged electrodes in such a particular structure may be provided by said casing and a rod positioned in said casing along the longitudinal axis of the spark plug. It is desirable that said casing is formed with an inwardly raised portion, disposed so as to define a spark gap together with said rod in a manner that the spark gap is narrowest at its end portion adjoining said opening.

Alternatively, according to another particular feature of this invention, said flow regulating means may be a pair of spaced guide vanes positioned to be traversed by a flow of the fuel-air mixture generated in the combustion chamber of an internal combustion engine. In this case, said pair of vanes may preferably serve also as the oppositely arranged electrodes. In such a particular structure, it is desirable that said pair of guide vanes define a converging and diverging space therebetween so that it provides a diverging spark gap to each flow of the fuel air mixture entering into the space at either of the two opposite openings of the space. In this case, an arc is initiated at a central region where the converging and diverging space portions join each other and is shifted in either direction absolutely through a diverging space regardless of its flowing direction. In this case, a converging space portion located upstream of the flow serves to introduce the flow of the fuel-air mixture smoothly into the spark gap. Therefore, according to a more particular feature of this invention, said converging and diverging space may preferably extend substantially perpendicularly to the longitudinal axis of the spark plug. Furthermore, it may be desirable that said converging and diverging space is substantially symmetrical with respect to said longitudinal axis of the spark plug.

BRIEF DESCRIPTION OF THE DRAWING

In the accompanying drawing.

DESCRIPTION OF THE PREFERRED EMBODIMENT

In the following, this invention will be described in more detail of the preferred embodiments with reference to the accompanying drawing.

Figure 1:
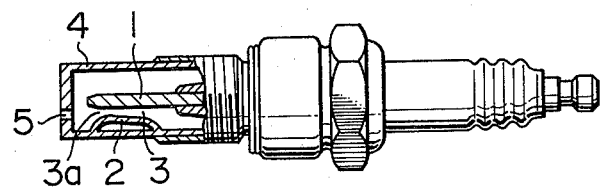
FIG. 1 is a side view partially in section showing an embodiment of the spark plug according to this invention.

Referring to FIG. 1, a set of oppositely arranged electrodes 1 and 2 define a spark gap 3 and all of these elements are housed in a casing 4 attached to the spark plug and forming a part of said spark plug and also defining a pre-combustion chamber therein. The casing 4 is formed with an opening 5 at a portion axially confronting the spark gap 3. When such a spark plug is mounted at a cylinder head portion of an internal combustion engine, a fuel-air mixture flows into the space enclosed by the casing 4 through said opening 5 as the volume of the combustion chamber is reduced during its compression stroke and generates a flow of the mixture traversing the spark gap 3. If a voltage is applied between the electrodes 1 and 2 at a proper time near the end of the compression stroke, an arc is initiated at a spark gap 3a where the distance between the two electrodes is the smallest. The arc generated at this portion is carried down by the flow of the fuel-air mixture entering from the opening 5 in the rightward direction as seen in FIG. 1. In this case, the arc can freely move along the spark gap 3, extending substantially in the same direction as the flow of the fuel-air mixture and, during such a movement, the arc is not expanded very much, except to the extent caused by a slight diverging of the spark gap 3 in the rightward direction as seen in FIG. 1. In this case, the fuel-air mixture filling up the space confined by the casing 4 will be sufficiently ignited before the arc traverses the whole length of the spark gap 3, and after that, it does not matter whether or not the arc exists since the combustion flames will begin to flow out, inversely through the opening 5 due to explosive expansion thereof.

Figure 3:
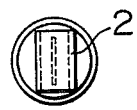
FIG. 3 is an end view observed along arrows III—III in FIG. 2.
Figure 2:
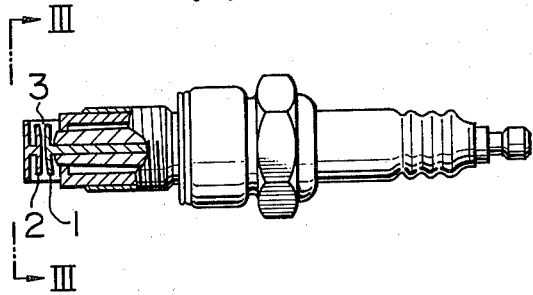
FIG. 2 is a view similar to FIG. 1 but showing another embodiment.

In the other embodiment shown in FIGS. 2 and 3, the oppositely arranged electrodes 1 and 2 define a spark gap 3 therebetween and also functions as a pair of guide vanes adapted to provide a flow passageway to guide a flow of the fuel-air mixture generated in the combustion chamber. When a spark plug of this type is employed, it is advantageous if the spark gap of the plug is positioned within an auxiliary chamber provided at an upper portion of the combustion chamber by a separate casing means in such a manner that the flow passage or the spark gap 3 provided by the guide vanes is aligned with the flowing direction of the fuel-air mixture supplied through the auxiliary chamber during the intake stroke of the engine. By such an arrangement, there can be obtained a stable igniting performance substantially the same as that obtained by the spark plug shown in FIG. 1.

In the embodiment shown in FIGS. 2 and 3, the flow passage or the spark gap 3 defined by a pair of guide vanes 1 and 2 is formed symmetrically with respect to the longitudinal axis of the plug so that the spark gap is shortest at the central region thereof and gradually increases toward opposite directions. In this case, therefore, only either half of the spark gap 3 operates in the same manner as the spark gap 3 in the embodiment shown in FIG. 1. At that time, the other half of the spark gap operates as guide means for effectively introducing the flow of the fuel-air mixture into the arc gap.

Although the spark gap formed in the embodiment shown in FIGS. 1–3 are adapted to widen gradually from its upstream end portion to its downstream end portion along the flow passage of the fuel-air mixture, the spark gap may, as an alternative, be defined by two oppositely arranged electrodes stretched substantially in parallel to each other along the flow direction of the fuel-air mixture to provide a constant spark gap for affording a stable arc over substantially the entire length thereof, except at its upstream end portion where the distance between the two electrodes is reduced by providing a proper raised portion to the electrodes to ensure that the arc is always initiated at this portion or the most upstream region of the spark gap.

We claim:

1. A spark plug comprising electrodes disposed adjacent to each other, said electrodes defining a spark gap therebetween, a flow regulating means axially confronting the spark gap for regulating the flow direction of a fuel-air mixture to the spark gap for traversing the spark gap, said spark gap being narrowest at a region located upstream of said flow and extending along the flow of the fuel-air mixture.

2. The spark plug according to claim 1, wherein the electrodes of the spark plug are housed in a precombustion chamber defined by a casing which forms part of the spark plug, said flow regulating means being an opening in said casing.

3. The spark plug according to claim 1, wherein the electrodes are disposed such that the spark gap widens gradually from its upstream portion to its downstream portion along the flow passage of the fuel-air mixture.

4. The spark plug according to claim 1, wherein the electrodes are disposed substantially parallel to each other along the flow direction of the fuel-air mixture to provide a constant spark gap for affording a stable arc over substantially the entire length thereof, said upstream end portion of the electrodes defining a narrowed portion to ensure that the arc is initiated at this portion of the spark gap.

5. The spark plug according to claim 2, wherein said opening is formed at a wall portion of said casing defining said pre-combustion chamber therein, said opening disposed substantially parallel to the longitudinal axis of the spark plug.

6. The spark plug according to claim 5, wherein said adjacent electrodes comprise said casing and a rod positioned in said casing along the longitudinal axis of the spark plug, said casing being formed with an inwardly raised portion disposed so as to define said spark gap together with said rod.

7. The spark plug according to claim 1, wherein said flow regulating means is a pair of spaced apart guide vanes positioned to be traversed by a flow of the fuel-air mixture generated in the combustion chamber of an internal combustion engine, said vanes also serving as electrodes.

8. The spark plug according to claim 7 wherein said pair of guide vanes define a converging and diverging space therebetween.

9. The spark plug according to claim 8, wherein said converging and diverging space extends substantially perpendicular to the longitudinal axis of the spark plug.

10. The spark plug according to claim 9, wherein said converging and diverging space is substantially symmetrical with respect to said longitudinal axis of the spark plug, and the narrowest portion of said converging and diverging space is in the central region thereof.

11. The spark plug according to claim 10, wherein one of said converging and diverging spaces extending on one side of the longitudinal axis of the spark plug defines a spark gap and the other side thereof serves as a guide means for effectively introducing the flow of the fuel-air mixture into said arc space.

12. The spark plug according to claim 11, wherein the electrodes of the spark plug are housed in a pre-combustion chamber defined by a casing which forms part of the spark plug.

* * * * *